United States Patent [19]
Watts, Jr. et al.

[11] 3,855,264
[45] Dec. 17, 1974

[54] PREPARATION OF HALOGENATED BENZONITRILE

[75] Inventors: Lewis William Watts, Jr.; Ernest Leon Yeakey; Philip Hotchkiss Moss, all of Austin, Tex.

[73] Assignee: Jefferson Chemical Company, Inc., Houston, Tex.

[22] Filed: May 18, 1970

[21] Appl. No.: 38,478

[52] U.S. Cl. .............................................. 260/465 G
[51] Int. Cl. ........................................... C07c 121/52
[58] Field of Search ................................. 260/465 G

[56] References Cited
UNITED STATES PATENTS 3,108,130   10/1963   Haga et al. ........................... 260/465
3,497,547   2/1970   Scheuermann et al. ............ 260/465

FOREIGN PATENTS OR APPLICATIONS
22,589   9/1968   Japan

OTHER PUBLICATIONS
Engelsma et al., Chemical Abstract, Vol. 53, p. 9128, (1959).

Primary Examiner—Lewis Gotts
Assistant Examiner—Dolph H. Torrence
Attorney, Agent, or Firm—James L. Bailey; John R. Kirk, Jr.

[57] ABSTRACT

A process for preparing halongenated derivatives of benzonitrile by a direct vapor phase reaction of a halogen and benzonitrile in an open tube. Halogenated benzonitriles are useful as fungicides.

3 Claims, No Drawings

PREPARATION OF HALOGENATED BENZONITRILE

CROSS-REFERENCE TO RELATED APPLICATION

The application of Lewis W. Watts and Philip H. Moss, Ser. No. 873,643, filed Nov. 3, 1969, refers to the direct vapor phase reaction of aromatic compounds, for example, biphenyl with halogens.

BACKGROUND OF THE INVENTION

1. Field of the Invention

The invention pertains to the field of synthesizing halogenated benzonitriles.

2. Description of the Prior Art

Japan Pat. No. 22,591 (1968) of Showa Denko K. K. and Mitsubishi Chemical Industry, Ltd. entitled "Pentachlorobenzonitrile Production" teaches the production of pentachlorobenzonitrile by reacting vapor of tolunitriles with chlorine gas at a temperature of 200° to 400°C. in the presence of a catalyst. The patent teaches that pentachlorobenzonitrile is an agricultural chemical, and is also a starting material for thermoresistant resins.

"Thermal Stability of Some Organic Compounds," Journal of Chemical and Engineering Data, 7, 227 (1962) indicates that benzonitrile decomposes in the gas phase at 570° to 600°C.

Our early laboratory experiments indicated that benzonitrile was quite resistant to chlorine under a wide variety of reaction conditions, even in the presence of chlorination catalysts when such chlorinations were attempted in the liquid phase. The high temperature, vapor phase process of our invention is an improvement over the prior art in that no catalyst is required in our process; thus complicated purification procedures are not required, and both yields and conversions are extremely high.

SUMMARY OF THE INVENTION

The invention is a process for halogenating benzonitrile and the partially halogenated derivatives of benzonitrile by the reaction of a halogen with a benzonitrile in the vapor phase in an open tubular reactor heated to a temperature of from about 650°C. to about 850°C.

PREFERRED EMBODIMENTS

Benzonitrile or partially halogenated benzonitrile can be readily halogenated by the interaction of a halogen, particularly chlorine, at high temperature in the gas phase in the absence of a catalyst. The vapor phase, noncatalytic chlorination of benzonitrile can be conducted in such a manner that high purity pentachlorobenzonitrile is produced. Since the reported decomposition temperature of benzonitrile is 570°-600°C., we predicted the decomposition of the compound in our high temperature process and expected to obtain hexachlorobenzene due to the anticipated cleavage of the benzonitrile.

The following examples demonstrate the conditions used in several vapor phase reactions between chlorine and benzonitrile in the presence of nitrogen as a diluent.

The reactions were carried out in a Vycor tube (21 inches × 25 mm.) which was externally heated along its whole length by an electric furnace. The maximum temperature given in the examples occurred at approximately midway along the reactor tube. In all of the examples, the chlorine was pressured into the reactor and measured by rotometer. The benzonitrile was pumped via a Ruska Proportioning Pump into a vaporizing pot. The resulting benzonitrile vapor was mixed with nitrogen which was also fed into the vaporizing pot. The gaseous mixture of benzonitrile and nitrogen then proceeded to the reactor inlet where it came in contact with the chlorine. The chlorine, benzonitrile, and nitrogen then proceeded to pass through the open tube reactor and the resulting halogenated product was collected by a water scrubber. The purity of the recovered product was measured accurately by gas-liquid chromatography. It was determined that the portion of the product which was not pentachlorobenzonitrile was a mixture of lower chlorinated benzonitrile products.

The following examples are only illustrative and are not meant to limit the scope of the invention. In the ranges used, the yield (conversion of benzonitrile to a chlorinated benzonitrile) was at or near 100 percent.

EXAMPLE I

A mixture of chlorine (91.2 l./hr.), nitrogen (173.1 l./hr.), and benzonitrile (12 cc./hr.) was passed through the inlet of a 21 inch × 25 mm. Vycor glass tubular reactor system which was heated to a maximum reactor temperature 721°C. with an electric furnace for a period of approximately 4.8 hours. The reactor effluent was passed through a collection system which led to a sodium hydroxide scrubber. The 159.0 grams (99.4 percent yield) of colorless pentachlorobenzonitrile melted at 212°-214°C. Analysis: calculated for $C_7Cl_5N$; 64.34 percent chlorine, found, 64.3 percent chlorine. After two crystallizations from chlorobenzene, the melting point of the material was 214°-214.5°. Analysis: calculated for $C_7Cl_5N$; 30.53 percent carbon, 64.34 percent chlorine, and 5.09 percent nitrogen, found, 30.71 percent carbon, 63.88 percent chlorine, and 5.03 percent nitrogen.

In addition to establishing the purity of the pentachlorobenzonitrile to be greater than 96 percent, gas chromatographic analysis of the crude reaction product also indicated that the benzonitrile conversion was complete, i.e., 100 percent.

EXAMPLE II

The reactor and collection systems just described were employed in the following halogenation example:

When benzonitrile (32.0 cc./hr.), chlorine, and nitrogen in molar ratios of 1:19.2:20.3 were introduced into the Vycor reactor tube at a maximum reactor temperature of 741°C. for 4 hours, 341.0 grams (99.7 percent yield) of 95 percent pure pentachlorobenzonitrile was isolated; under these conditions, the benzonitrile conversion was 100 percent.

Any of the halogens are useful in the process of our invention but the one preferred is chlorine.

A diluent material may be introduced into the reaction zone along with the vaporized halogen and vaporized benzonitrile. The necessary properties of the diluent are that it be inert to the reaction between the halogen and the benzonitrile and that it be a gas or vapor at the reaction temperature. Convenient diluents are nitrogen or hydrogen chloride.

The temperature of the reaction, ratio of reactants and velocity of thruput determine the degree of halogenation and the percent conversion (yield) of the benzonitrile to the halogenated benzonitrile. Since such a wide range of reactants and products are possible using the process of our invention, general parameters are not applicable.

At some minimum temperature above the boiling point of the benzonitrile and the halogen, about 400°C., the reactants will begin to react in the vapor phase and a low yield of partially halogenated benzonitrile will result. As the temperature is increased, the yields and degree of halogenation will increase. Further temperature increase will result in almost 100 percent yield of halogenated benzonitrile. Finally, as the temperature is raised further, the degree of halogenation reaches about 100 percent also. As stated, the temperature where about 100 percent yields and about 100 percent halogenation occurs, 650°C. to 850°C., is well above the published decomposition temperature of the aromatic and the halogenated aromatic and yet no decomposition occurs in our process. The preferred maximum temperature where about 100 percent yield of about 100 percent halogenated benzonitrile is obtained is about 850°C., but higher temperatures may be used if desired. When chlorinations were conducted at similar chlorine to benzonitrile ratios with comparable contact times, an elevation in the maximum reactor temperature from 702°C. to 719°C. increased the pentachlorobenzonitrile purity from 84.3 to 98.0 percent.

Holding temperature and ratio of reactants constant, the contact time may be adjusted from short to long with similar effects as increases in temperature. The same may be said of ratio of halogen to benzonitrile.

By adjusting both the chlorine and nitrogen content of the feed gas, the chlorine to benzonitrile ratio can be varied while the approximate contact time is mantained at 3 seconds. In a series of experiments the chlorine to benzonitrile ratio was varied over the range 10:1 to 34.6:1 while the reaction temperature and approximate contact time remained at 720° ± 6°C., and 3 seconds, respectively. The benzonitrile conversion was quantitative in each of the experiments performed during this investigation. Under these reaction conditions, an increase in the molar ratio of chlorine to benzonitrile from 10:1 to 15:1 gave an increase in the purity of pentachlorobenzonitrile from 62.6 percent to 73.5 percent. By increasing the chlorine to benzonitrile ratio to 25:1, the purity of pentachlorobenzonitrile was increased to 93.6 percent and by increasing the chlorine to benzonitrile ratio to 35:1, the purity of pentachlorobenzonitrile was increased to 96.1 percent. Therefore, for high purity pentachlorobenzonitrile, the chlorination should be conducted in the presence of a relatively large excess of chlorine, preferably at a chlorine to benzonitrile ratio greater than 15:1. However, the utilization of ratios in excess of 25:1 are not necessary for the formation of high purity pentachlorobenzonitrile. If less than 100 percent pure pentachlorobenzonitrile forms, an increase in the reaction temperature, contact time, and the chlorine to benzonitrile ratio enhances the purity of the pentachlorobenzonitrile.

The purity of pentachlorobenzonitrile varies according to contact time. In a series of experiments the contact time was varied at a fixed chlorine to benzonitrile molar ratio of 34.5:1 and temperatures of 710° ± 6°C. An increase in contact time from 1.4 to 2.6 seconds showed an increase in purity of pentachlorobenzonitrile from 75.7 to 94.9 percent. The benzonitrile conversion was quantitative in each of the experiments performed during this investigation.

We claim:

1. A process for preparing chlorinated benzonitrile by reacting in a vapor phase chlorine and benzonitrile or partially chlorinated derivatives of benzonitrile, which comprises:

contacting the chlorine with the benzonitrile in an open tubular reactor heated to a temperature of from about 650°C. to about 850°C.

2. A process according to claim 1 wherein chlorine is reacted with benzonitrile.

3. A process according to claim 2 wherein chlorine is reacted with benzonitrile to form pentachlorobenzonitrile.

* * * * *